(12) United States Patent
Hoffert

(10) Patent No.: US 11,046,568 B2
(45) Date of Patent: Jun. 29, 2021

(54) ELASTICIZED FUNNEL FOR DUMPING OF PAPER SHREDDER WASTE BIN

(71) Applicant: Deborah Hoffert, Lakewood, CA (US)

(72) Inventor: Deborah Hoffert, Lakewood, CA (US)

( * ) Notice: Subject to any disclaimer, the term of this patent is extended or adjusted under 35 U.S.C. 154(b) by 0 days.

(21) Appl. No.: 16/355,839

(22) Filed: Mar. 18, 2019

(65) Prior Publication Data

US 2020/0299121 A1 Sep. 24, 2020

(51) Int. Cl.
*B67C 11/02* (2006.01)
*B65F 1/12* (2006.01)

(52) U.S. Cl.
CPC ............. *B67C 11/02* (2013.01); *B65F 1/12* (2013.01); *B65F 2240/156* (2013.01)

(58) Field of Classification Search
CPC ............. B67C 11/00; B67C 11/02; B65F 1/12
USPC .................................................. 141/331–345
See application file for complete search history.

(56) References Cited

U.S. PATENT DOCUMENTS

| | | | | |
|---|---|---|---|---|
| 1,596,974 A * | 8/1926 | Holmes | ............... | B67C 11/02 141/335 |
| 1,636,679 A * | 7/1927 | Burch | ............... | A01D 46/26 193/7 |
| 2,073,914 A * | 3/1937 | Wilfley | ............... | B65B 39/08 141/314 |
| 2,924,253 A * | 2/1960 | Beddow | ............... | B67C 11/02 141/337 |
| 3,349,936 A * | 10/1967 | Morton | ............... | A47G 29/06 217/3 BC |
| 3,579,652 A * | 5/1971 | Ericson | ............... | A61B 10/007 4/144.2 |
| 4,784,184 A * | 11/1988 | Gates | ............... | E03C 1/086 138/109 |
| 4,825,915 A * | 5/1989 | Hess | ............... | B65D 33/002 141/337 |
| 5,078,189 A * | 1/1992 | Ronsonet | ............... | B67C 11/02 141/331 |
| 5,091,998 A * | 3/1992 | Witzke | ............... | A61F 5/4556 141/333 |
| 5,839,631 A * | 11/1998 | Hebert | ............... | A63B 47/007 224/251 |
| 5,996,999 A * | 12/1999 | Casely | ............... | A63F 3/00895 273/148 R |
| 6,099,441 A * | 8/2000 | Bonnet | ............... | A63B 21/072 482/106 |

(Continued)

*Primary Examiner* — Timothy L Maust

(57) ABSTRACT

A nylon fabric funnel with a diameter of approximately 15 inches at the upper inlet opening, having an elastic band encased in the nylon, with a stretchability factor of approximately 0%-30%, a length of approximately 24 inches, and a diameter of approximately 12.5 inches at the lower non-elasticized discharge opening of the funnel, adapted for secure attachment to a paper shredder waste bin. The lower non-elasticized discharge end of the funnel is placed in a second receptacle, hanging freely, allowing for controlled flow of the shredded paper from a paper shredder waste bin to the second receptacle. A nylon fabric storage bag with dimensions of 9 inches wide by 10 inches long and 2 inches deep, configured to house the funnel securely, via Velcro strips, adapted to allow for bag closure, as well as attachment of the storage bag to the outside casing of the paper shredder machine, when the funnel is not in use.

1 Claim, 3 Drawing Sheets

1 Nylon, static-free fabric funnel
2 Seams to be located on the outside of funnel for smooth interior so the paper shreds do not get caught on seams
3 Stitching to hold in 2-inch elastic band
4 Stitching to hold seams out at discharge end of funnel
5 2-inch elastic band (not visible from assembled view)

(56) References Cited

U.S. PATENT DOCUMENTS

| | | | | |
|---|---|---|---|---|
| 6,276,411 B1* | 8/2001 | Veneziano | ............. | B67C 11/02 |
| | | | | 141/337 |
| 6,708,835 B1* | 3/2004 | Mathis | ................. | B65D 21/083 |
| | | | | 150/154 |
| 6,776,201 B2* | 8/2004 | Willis | .................... | B67C 11/02 |
| | | | | 141/337 |
| 7,237,583 B2* | 2/2007 | Salani | .................... | B65D 25/48 |
| | | | | 141/337 |
| 7,237,753 B2* | 7/2007 | Metcalfe | ............ | B65B 67/1238 |
| | | | | 193/15 |
| 7,635,013 B2* | 12/2009 | Ballinger | ................ | B67C 11/00 |
| | | | | 141/331 |
| 2002/0038677 A1* | 4/2002 | Wiethoff | ................ | B65B 39/00 |
| | | | | 141/337 |
| 2002/0074247 A1* | 6/2002 | Tremblay | ............... | B65D 5/008 |
| | | | | 206/223 |
| 2011/0214782 A1* | 9/2011 | McGeary | ................ | B67C 11/00 |
| | | | | 141/337 |
| 2019/0239563 A1* | 8/2019 | Partosh | .................. | B65D 65/12 |

* cited by examiner 1 of 3
Assembled View

1  Nylon, static-free fabric funnel
2  Seams to be located on the outside of funnel for smooth interior so the paper shreds do not get caught on seams
3  Stitching to hold in 2-inch elastic band
4  Stitching to hold seams out at discharge end of funnel
5  2-inch elastic band (not visible from assembled view)

2 of 3
Exploded View

1  Nylon, static-free fabric funnel

2  Seams to be located on the outside of funnel for smooth interior so the paper shreds do not get caught on seams 5  2-inch elastic band FIG.3
3 of 3
Bag

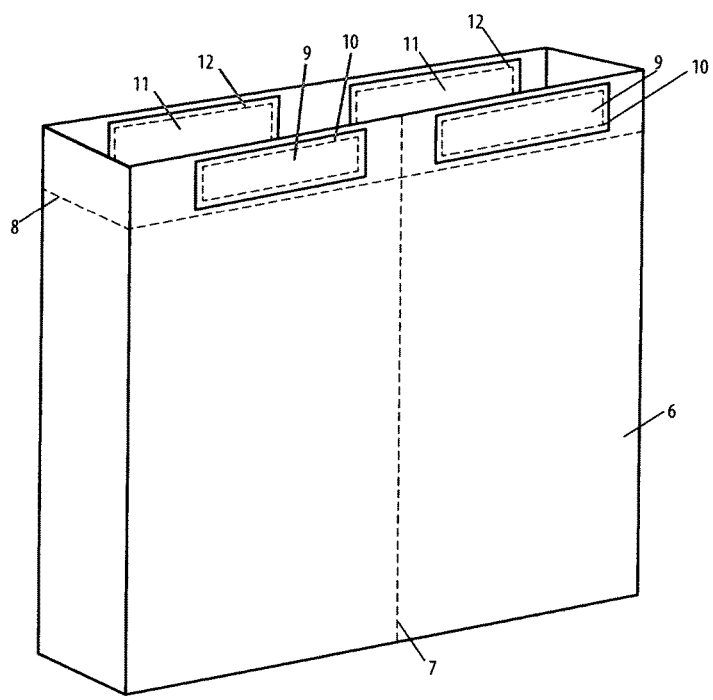

6  Nylon, static-free fabric bag

7  Bag seam located on back of bag

8  Bag hem seam located below velcro

9  Two velcro strips on back side of the bag for attachment when the Shredder Dumper is not in use 10  Stitching to attach velcro strips 11  Four velcro strips located on the inside of bag mouth. Two on each side of mouth (two not visible from this view) to close bag when not in use.

12  Stitching to attach velcro strips

ELASTICIZED FUNNEL FOR DUMPING OF PAPER SHREDDER WASTE BIN

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention generally relates to funnels, and more specifically, to a fabric funnel adapted to transfer shredded paper from one receptacle to another, in combination with its storage bag.

2. Description of Related Art

Many funnel systems are used to transfer a variety of substances, commonly liquids, from one container to another. Funnels for liquid transfer are made with impervious material to avoid liquids leaking out of the funnel. Funnels with an elastic tube are fabricated from a thin latex material to avoid leaking. Common fabric funnels used for transferring non-liquid material do not have an elasticized inlet opening that allows for frictional attachment to a waste bin; which eliminates the frustrating task of cleaning up shredded paper when emptying the waste bin that can be reused and stored for next use. A fabric funnel with an elasticized inlet opening, eliminates the need for purchase of disposable plastic bags which need to be replenished, and can be expensive. Said invention would be a practical addition to the art.

U.S. Pat. No. 6,776,201-B2 (Willis) 08-2004 comprises an elastic tube fabricated from a latex material to prevent liquid leaks, for attachment to the outlet of a liquid filled container, with an approximate length of 2.5 and 5.5 inches, and is disposable, with no provision for transfer of non-liquid material.

U.S. Pat. No. 2,073,914-A (Wilfley) 03-1937 discloses a non-elastic canvas funnel where the upper edge is provided with a wide hem in which is positioned a metal bar that is bent into a rectangle shape. Two rings at the end of the frame serve to attach a rope or cord that can go around the neck. There is also a metal ring in the smaller end of the funnel that serves to hold it in the expanded position. The canvas piece of this invention, not including the frame, handle and rings, can be folded into a small bundle for transportation, with no provision for a storage bag. The frame and ring are integral with the funnel to provide hands free sacking of ore samples, with no provision for an elastic upper edge or a fabric end without a metal ring.

U.S. Pat. No. 7,237,583 (Salani) 02-2007 is a funnel formed form a flat piece of stock to be used with fluid or as a substrate for printed indicia and used as or incorporated into a printed publication with no provision for frictional attachment to a receptacle.

U.S. Pat. No. 4,784,184 (Gates) 11-1988 shows an elastic hose for conducting liquid, specifically adapted for attachment to a faucet outlet, with no provision for non-liquid use.

U.S. Pat. No. 3,579,652 (Ericson) 05-1971 represents a funnel for urine collection with no provision for non-liquid use.

U.S. Patent No: 20020038677-A1 (Wiethoff) 04-2002 depicts a disposable funnel with repositionable adhesive strips and silicone coated release liner to provide a plurality of funnels in the form of a pad for liquid and culinary uses with no provision for re-use or storage.

U.S. Pat. No. 7,635,013-B2 (Ballinger) 12-2009 represents a cap assembly where the funnel is for liquid use with no provision for non-liquid use.

U.S. Pat. No. 5,078,189 (Ronsonet) 01-1992 is a rectangular sheet of flexible plastic that can be configured into a funnel shape for moving fluids with no provision for a frictional attachment to a receptacle or non-plastic fabrication.

U.S. Pat. No. 4,825,915 (Hess) 05-1989 shows a disposable funnel for pouring liquids or powders constructed from sheet metal, preferably, with no provision for non-liquid use.

U.S. Pat. No. 2,924,253 (Beddow) 02-1960 is a rubber or plastic funnel and clip assembly for use with a gas tank of an outboard motor, for example, with no provisions for frictional attachment to a receptacle or non-liquid use.

U.S. Pat. No. 1,596,974 (Holmes) 08-1926 shows a funnel for holding water for filling radiators with no provision for non-liquid use.

U.S. Patent No: 2002074247-A1 (Tremblay) 06-2002 represents a funnel for liquid use and storage case, preferably formed of a plastic material with no provision for non-liquid use.

U.S. Patent No: 20110214782-A1 (McGeary) 09-2011 is a funnel for aiding the filling of vehicle fuel tanks from a portable container that comprises one or more regions of a magnetic material to attachment to steel body panels of a vehicle or other object with no provision for non-liquid use.

U.S. Pat. No. 6,708,835-B1 (Mathis) 03-2004 is a fabric extension of an ordinary laundry basket to increase carrying capacity of the basket. It is not tapered like a funnel, nor does is have an elastic band at the inlet opening, rather, it shows clips that attach the fabric to the basket, as it is not intended to prevent tiny objects such a shredded paper from falling out of the laundry basket.

All of the patents referenced herein depict various funnels, but none represent a non-disposable, non-latex fabric funnel with an elastic band encased in fabric, preferably nylon, at the upper end of the funnel that allows frictional attachment to a waste bin for non-liquid use, that can fold into a storage bag and attach to a paper shredder machine, or elsewhere. Nor could any of the funnels represented in said patents be utilized as a replacement for the funnel in this embodiment.

BRIEF SUMMARY OF THE INVENTION

The present invention is a fabric funnel, preferably nylon, having an elastic band incased in the fabric at the upper inlet end of the funnel, for frictional attachment to a paper shredder waste bin to prevent shredded paper from spilling out of the paper shredder waste bin when emptying the bin. The funnel is stored in a fabric bag comprised preferably of nylon that houses the fabric funnel securely, via Velcro strips, adapted to allow for bag closure as well as attachment of the bag to the outside casing of the paper shredder machine, when not in use.

BRIEF DESCRIPTION OF THE SEVERAL VIEWS OF THE DRAWINGS

FIG. 3 is a three quarter view of the Bag. This demonstrates where the folded funnel (1) unit is stored in between uses. It also shows the where the Velcro strips (11) are located that keep the bag closed at the top; and the Velcro strips (9) at the back to keep the bag attached to the outside of the paper shredder. The description is as follows:
1. Nylon static free fabric (6) is recommended for the bag (6)
2. The bag seam (7) is located on the back of the bag (6)
3. Bag hem seam (8) located below Velcro (9)
4. Two Velcro strips on the back side of the bag (9) for attachment to the paper shredder when the funnel is not in use.
5. Stitching to attach Velcro strips (10)
6. Four Velcro strips (11) located on the inside of the bag "mouth". Two on each side of the "mouth" (11) and two (not visible from this view) to close bag (6) when not in use.
7. Stitching to attach Velcro strips (12).

Figure 1:
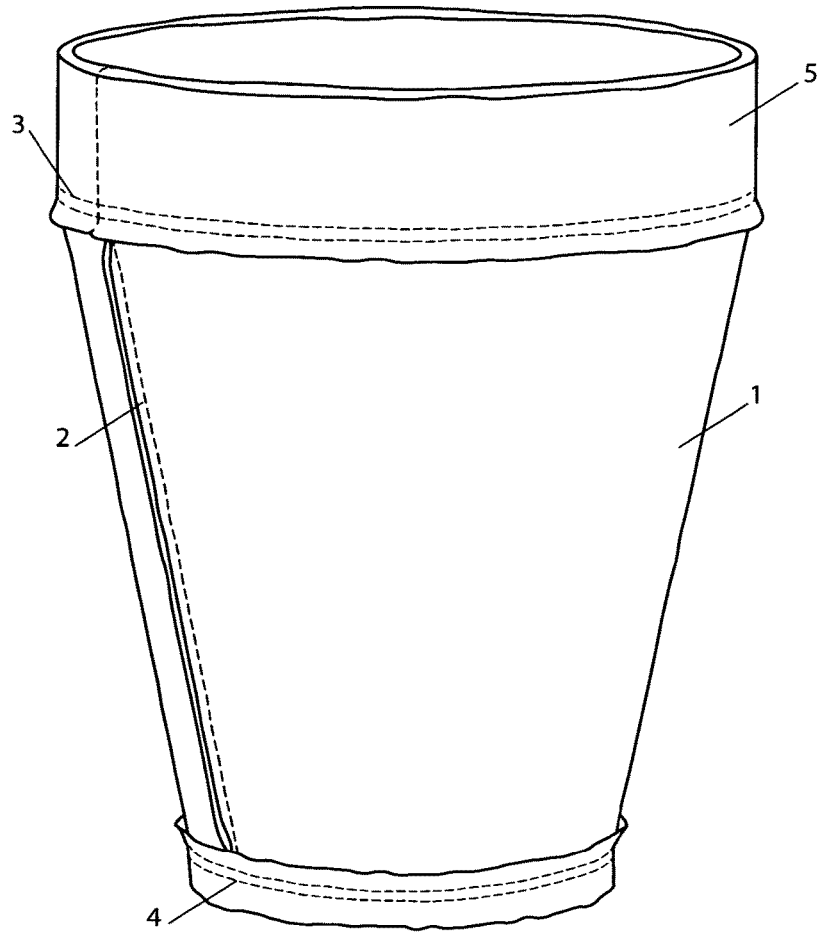
FIG. 1 is an Assembled View. This is a front view perspective of the funnel unit. The description is as follows:
1. Nylon static free fabric is recommended for the funnel (1)
2. Seam stitching (2) is located on the outside of the funnel (1) to provide a smooth interior so shredder paper passes easily through the funnel (1).
3. Stitching (3) to hold 2" elastic band (5)
4. Stitching to hold seams outside (4) at discharge end of funnel (1) to provide smooth exit from funnel (1).
5. 2" elastic band (5) (not visible in Assembled View) that is encased in a one piece nylon fabric funnel (1) that is gathered at the top to allow for stretch. The nylon fabric forms a funnel (1) beneath the elastic band.
Figure 2:
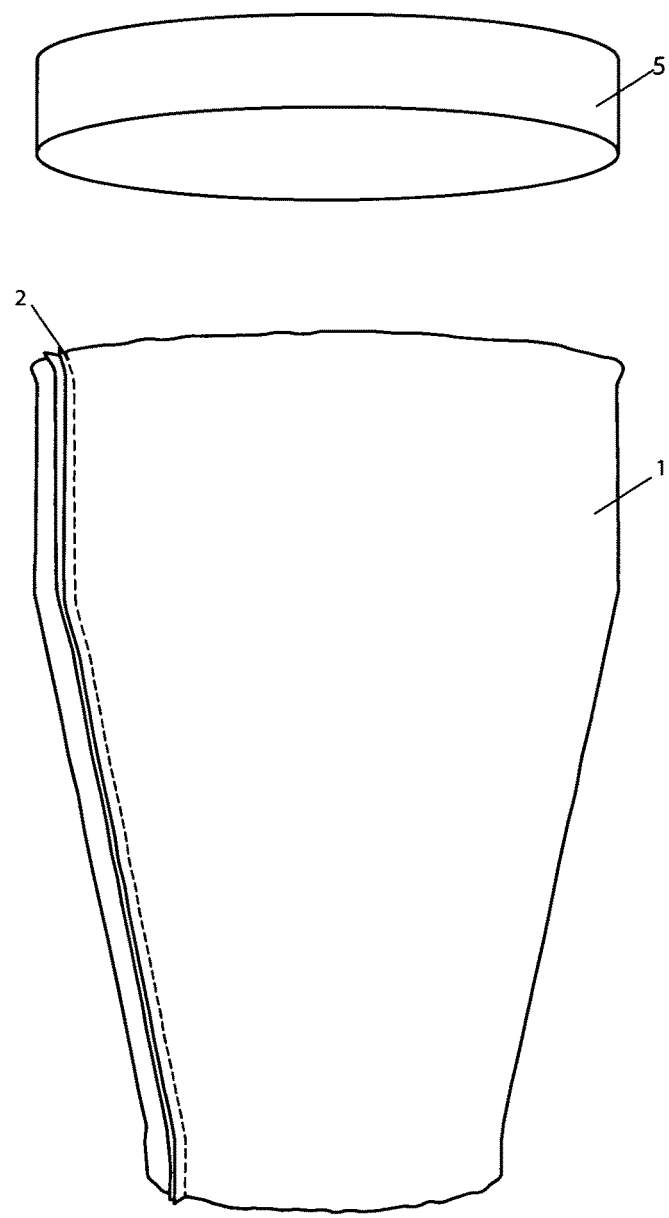
FIG. 2 is an Exploded View. This perspective identifies the elastic band (5) at the top of the funnel (1). The parts are sewn together to make up the one piece funnel (1) unit. The description is as follows:
1. Nylon static free fabric is recommended for the funnel (1)
2. Seam stitching (2) is located on the outside of the funnel (1) to provide a smooth interior so paper shreds pass easily through the funnel (1).
3. 2" elastic band (5) that is encased at the top (3) of the one piece fabric funnel (1)

This is not the only embodiment of the instant invention. Alternatively:
  Any smooth, static-free fabric that would not prevent the movement of shredded paper down the funnel could be used.
  The size of the funnel can vary depending on the size of the shredder waste bin. In one version, the funnel was about 15" wide across the top opening with 0%-30% stretchability, the funnel taper was about 24" long and the opening at the discharge end of the funnel was about 12.5" wide.
  The storage bag can vary depending on the size of the shredder waste bin. In one version, the bag dimensions were about 9" wide, 10" long and 2" deep.
  The storage bag can be of a different shape and construction provided it can affix directly to the paper shredder without blocking any vents that may be on the paper shredder casing.
  The number of Velcro strips to affix the bag to the shredder can vary depending on the size of the shredder waste bin.
  The elasticized funnel is not restricted to shredded paper dumping alone. It could be used to assist the transfer of other items, such as packing materials from a shipping box, or sand from a kitty litter box, into a trash bin or other location—provided the elasticized upper end of the funnel fits snugly around the receptacle that is being dumped, and the items being dumped are small enough to exit the funnel.

DETAILED DESCRIPTION OF THE INVENTION

The present invention is a fabric funnel, preferably nylon, having an elastic band incased in the fabric at the upper inlet end of the funnel for frictional attachment to a paper shredder waste bin, to prevent shredded paper from spilling out of the shredder waste bin when emptying the bin. The funnel stores in a fabric bag, preferably nylon, which attaches via Velcro strips to the outside of a paper shredder between uses.

The principle objective to the invention is to provide a way to empty a shredder waste bin without requiring additional clean up. Many paper shredders for home/office use have a square or rectangular shaped, four sided waste bin. The bin has a higher profile on the front facing side of the bin, than the three other sides of the bin that fit into the shredder cavity. The uneven shape of the bin presents a challenge to empty it without the contents spilling over. As the bin is angled to be emptied, the shredded paper does not flow out evenly, which can cause a shredded paper mess, requiring additional clean up.

Another object of the invention is to offer an alternative to purchasing the one-time use plastic bags that can be inserted inside the shredder waste bin. These often do not fit snugly (due to the odd shape of the bin). Or, for shredders that have a four even-sided waste bin, the bags often fall into the bin or come away from the sides of the bin during shredding. This can cause shredded paper to drop into the bin itself, or outside the bin—again, requiring additional clean up. Additionally, these plastic bags can be expensive to purchase, and must be replaced when the consumer runs out.

Still another object of the invention is to offer an alternative to using plastic disposable bags, in an effort to reduce the amount of plastic products in landfills.

As presented, one size is observed to fit small to medium paper shredders. However, the funnel and the storage bag may be made in a variety of different sizes.

Having descried my invention as such, I claim:

1. In combination, a nylon fabric funnel and a nylon fabric storage bag, with said storage bag dimensions of 9 inches wide by 10 inches long by 2 inches deep, having Velcro strips to secure a closure of said storage bag, and to affix said storage bag to an outside casing of a paper shredder, which is configured to house said nylon fabric funnel consisting of a tubular member defined by an upper inlet opening consisting of a 2 inch wide elastic band encased in the nylon; the upper inlet opening having a diameter of approximately 15 inches and having a stretchability factor of 0%-30%, for the transfer of shredder paper from a paper shredder receptacle into a second receptacle, wherein said tubular member has a length of approximately 24 inches, allowing shredded paper to have an unobstructed flow through said tubular member from said upper inlet opening to a lower non-elasticized discharge opening having a diameter of approximately 12.5 inches.

\* \* \* \* \*